United States Patent
Gruaz et al.

(10) Patent No.: US 8,209,151 B2
(45) Date of Patent: Jun. 26, 2012

(54) TEST ASSEMBLY AND PROCEDURE FOR CAPTURING PERFORMANCE DATA

(75) Inventors: Jerome Gruaz, Graz (AT); Klaus-Christoph Harms, Graz (AT); Martin Rzehorska, Peggau (AT); Rüdiger Teichmann, Hart b. Graz (AT)

(73) Assignee: AVL List GmbH, Graz (AT)

( * ) Notice: Subject to any disclaimer, the term of this patent is extended or adjusted under 35 U.S.C. 154(b) by 373 days.

(21) Appl. No.: 12/458,285

(22) Filed: Jul. 7, 2009

(65) Prior Publication Data

US 2010/0017169 A1   Jan. 21, 2010

(30) Foreign Application Priority Data

Jul. 10, 2008   (AT) ............................... GM 379/2008

(51) Int. Cl.
*G06F 15/00* (2006.01)

(52) U.S. Cl. ........ 702/189; 702/104; 702/116; 702/183; 73/760; 73/779; 73/799

(58) Field of Classification Search .................. 702/189, 702/116, 183, 104; 73/760, 779, 799
See application file for complete search history.

(56) References Cited

U.S. PATENT DOCUMENTS

| 4,467,271 | A |   | 8/1984  | Ruckenbauer et al. |
|-----------|---|---|---------|--------------------|
| 5,220,836 | A |   | 6/1993  | Harms |
| 5,353,009 | A | * | 10/1994 | Marsh et al. .................. 340/505 |
| 5,792,951 | A |   | 8/1998  | Ismail et al. |
| 7,062,975 | B2 |  | 6/2006  | Schmid et al. |
| 7,124,667 | B2 |  | 10/2006 | Scharer |
| 2003/0069713 | A1 | | 4/2003 | Friedl et al. |
| 2007/0110620 | A1 | | 5/2007 | Pechstein et al. |
| 2009/0132194 | A1 | | 5/2009 | Tischendorf et al. |
| 2010/0007476 | A1 | | 1/2010 | Klotz et al. |

FOREIGN PATENT DOCUMENTS

| DE | 202006020 | 11/2007 |
| DE | 202006020112 | 11/2007 |

* cited by examiner

*Primary Examiner* — Drew A Dunn
*Assistant Examiner* — Hien Vo
(74) *Attorney, Agent, or Firm* — Dykema Gossett PLLC

(57) ABSTRACT

In order to make error recognition, for example, in cabling, in the stored data or in the data allocation, in the allocation of a sensor unit to sensor-relevant data for calibration of an analysis unit that is connected with a sensor unit possible, a sensor identification (6) is located in or on the sensor unit that can be polled by the analysis unit (4) and to which sensor-specific data are allocated in a storage unit (5), and a data carrier (7) is located in or on the sensor unit in which a second set of sensor-specific data are stored that can be read by the analysis unit (4) and can be compared with the first set of sensor-specific data of storage unit (5). Upon agreement of the first and second set of sensor-specific data, the measuring signals are transformed into measurement data by considering the sensor-specific data.

4 Claims, 1 Drawing Sheet

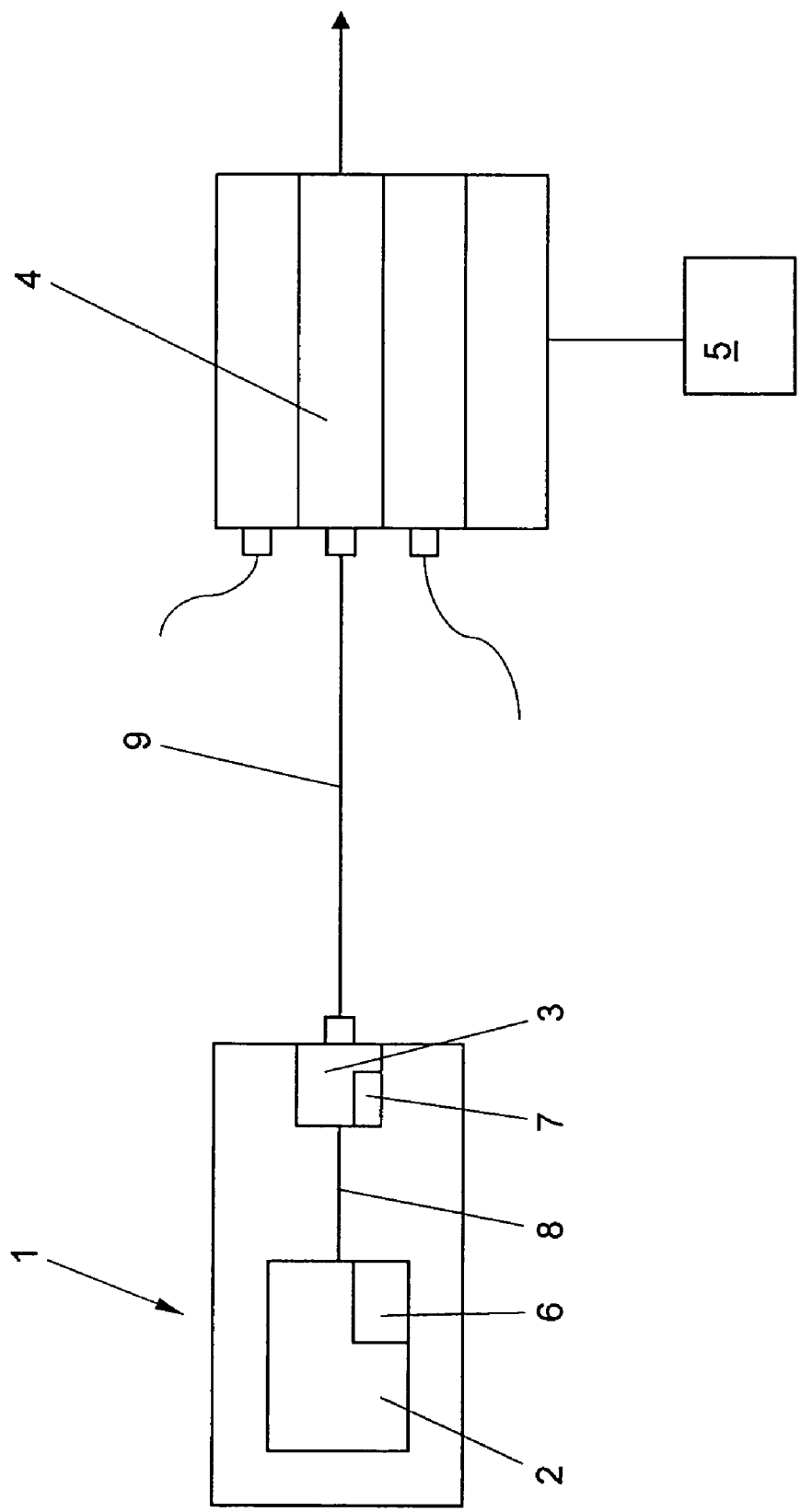

TEST ASSEMBLY AND PROCEDURE FOR CAPTURING PERFORMANCE DATA

BACKGROUND OF THE INVENTION

1. Field of the Invention

The present invention concerns a test assembly and a procedure for capturing measurement data with a sensor unit, the sensor element of which supplies measurement signals and an analysis unit connected with it by a measurement line that transforms the measurement signals into measurement data, whereby in or on the sensor unit a sensor identification is provided that can be polled by the analysis unit, and with a storage unit in which the first set of sensor-specific data that is allocated by the polled sensor identification are stored that can be read by the analysis unit.

2. The Prior Art

In test assemblies, particularly in test stand environments, such as, for example, a test for combustion motors or drive trains or entire vehicles, a number of sensors are used in order to capture various measurement variables such as, for example pressure, temperature, etc., analyze such and process such further. The individual sensors, even those of the same type and model are thereby individual units with various parameters and calibration data such as, for example ranges of measurement, sensitivities, operating times, etc. Moreover, additional data are also connected with sensors, such as, for example, serial numbers, manufacturers, useful life, etc. An analysis unit that must process the data supplied by the sensors must, in order to deliver correct measurement results, consider the sensor-specific data and must therefore be supplied with this data or calibrated. Such a calibration process is, however, particularly in an environment with many sensors, an expensive and error-prone process. For this reason, a number of improvements have already been proposed, at least to make an automatic calibration of the analysis unit possible with the sensor-specific data.

From EP 1 302 755 B1 and U.S. Pat. No. 5,792,951 A it is known to locate a data carrier with sensor-specific data such as, for example, calibration data at a distance from the sensor element in a plug for connecting a cable for the purpose of connecting the sensor with the analysis unit. In order to ensure a clear and safe allocation of the stored sensor-specific data to the sensor, the plug must be inseparably connected with the sensor element—the sensor element with the connection cable and the plug thus forms an inseparable unit. If a sensor must be exchanged, the entire unit must consequently be exchanged, which in turn increases costs, as the cable and the plug normally are not damaged in operation and could consequently be used again. Moreover, there is no guarantee that the data carrier in the allocated plug also actually pertains to the inseparably connected sensor, as even in a firm connection of the plug with the sensor a mix-up could take place that can subsequently not be determined easily.

EP 1 300 657 A2 in turn describes an arrangement in which in or on the sensor element an identification unit with sensor identification is located with which the sensor unit can be identified. The sensor identification can be read by the analysis unit and can be used for polling sensor-specific data from a storage unit that is at a distance from the sensor unit. With that, a clear recognition of the sensor unit and the allocation to the sensor-specific data that was stored for the sensor is guaranteed. However, this allocation requires that the sensor-specific data is actually stored in the storage unit and is also correctly allocated to certain sensor identification. On the one hand, this increases the administrative effort as the storage unit must always be kept up to date. On the other hand, the problem of errors is thereby only displaced from the cabling to the allocation of the sensor identification of the sensor-specific data in the analysis unit or storage unit.

An error recognition, for example, in cabling, in the stored data or in the data allocation is, however, not possible in either process. Thus, in both variants, a certain residual risk of error remains which could end up as a (non recognizable) erroneous measurement.

It is therefore an objective of the present invention to indicate a process and an arrangement for capturing measurement data with automatic calibration by an analysis unit that also makes error recognition in the calibration or in the allocation of a sensor to sensor-specific data possible.

SUMMARY OF THE INVENTION

This problem is solved by providing a data carrier in or at the sensor unit in which a second set of sensor-specific data is stored that are readable by the analysis unit and can be compared with the first sensor-specific data of the storage unit and the analysis unit upon agreement of the first and second set of sensor-specific data transforms the measuring signals into measurement data by considering sensor-specific data. As a result of the presence of sensor-specific data in duplicate, this redundancy can be used to recognize and display potential errors that are revealed by a comparison of the first and second set of sensor-specific data and thus to react to such in a suitable manner.

In an advantageous embodiment, the sensor identification is located in or on the sensor element as with such, the sensor identification is firmly connected with the sensor element and thus, later mix-ups are made impossible. Further, a sensor element can be used that is not sensitive to extremely rough environments such as, for example, high temperatures, pressure, aggressive media, etc., whereby such a sensor unit can be used very flexibly.

Preferably, the data carrier is located outside of the sensor element, and thus outside of the direct (possibly rough) environment of the sensor element, whereby advantageously, ordinary electronic components can be used.

BRIEF DESCRIPTION OF THE FIGURE

FIG. 1. Depicts a test assembly for capturing measurement data according to a preferred embodiment of the present invention.

DETAILED DESCRIPTION OF THE PREFERRED EMBODIMENTS

The sensor unit 1 comprises, according to the example of an embodiment in FIG. 1, a sensor element 2 for example, a sensor for capturing mechanical, electrical, physical or chemical measurement variables, and a sensor plug 3 for connecting a measurement line 9. Sensor element 2 and sensor plug 3 are connected by a sensor line 8. Advantageously, the sensor element 2 and the sensor plug 3 are inseparably connected with each another by sensor line 8, in order to guard against later mix-ups of sensor plug 3 with data carrier 7 and sensor element 2 with sensor identification 6. But sensor plug 3 could likewise also be located directly on sensor element 2, whereby sensor line 8 could be dispensed with. The measuring signals supplied by sensor element 2 and transmitted by measuring line 9 to an analysis unit 4 are transformed into corresponding measurement data in analysis unit 4. Thereby, several measuring channels can be provided in an analysis unit 4, as is indicated in FIG. 1, and to it, as a rule, several sensor units 2 can be connected. The analysis unit 4 can supply the measurement data to a superordinate processing unit, for example, a central test stand, as indicated in FIG. 1 by the arrow.

In or on the sensor element 2, a sensor identification 6 is located that clearly identifies sensor element 2 individually. Sensor identification 6 can be designed differently, for example, when sensor element 2 is a piezoelectric readings recorder, it can be formed by the piezoelectric element itself. By using the inverse piezo effect, the piezoelectric element can be operated as oscillation element whose resonance spectrum can be used for sensor identification. Possibilities and specific embodiments for resonance stimulation and analysis of this type are known, for example, from CH 657 457 A5, AT 387 286 B or also AT 393 416 B. Naturally, arrangements are preferred here in which usually the connection cables or measurement lines that are used for normal measuring operations can simultaneously be used for polling the sensor identification 6 of sensor element 2. Thereby, in a preferred manner, as a result of design measures the oscillation behavior of sensor element 2 can be designed to be individual, so that the separation accuracy of sensor identification 6 is improved. This can take place, for example, by designing the sensor element or its environment itself or by targeted design of one or more additional oscillation elements. According to a different preferred embodiment, the sensor identification 6 can be designed as an acoustic surface wave element, that can be charged with a high frequency impulse and that supplies as an answer the signals for sensor identification. In the process, the wave that is stimulated on the surface of the piezoelectronic material is influenced by attachment, switching or impedance load of convertors or reflectors in such a way that from the answer of the element to the high frequency impulse, information, for example, a simple identification code, can be obtained. An arrangement of this type is described per se, for example, in DE 44 05 647 A and it is suitable for single storage of a limited number of bits that can be polled repeatedly. This type of element works purely passively, whereby the high frequency (typically in the range of over 400 MHz) allows for an efficient inductive coupling without interaction with the measurement and resonance frequencies. As piezoelectric substrate for these surface wave elements such as quartz, $GaPO_4$ or langasite can be used, for example. In a particularly preferred embodiment of the invention, a piezoelectric measurement itself can also serve as substrate for the surface wave element. According to a further preferred embodiment of the invention, the sensor identification 6 of sensor element 2 can also be designed as oscillation element that can be electrically stimulated to mechanical oscillations with various resonance frequencies, whereby the pattern of resonance frequencies that can be polled using one variation of the stimulation frequency serves to identify the sensor. In this process there thus is a structure that can oscillate mechanically in the sensor element 2 with a certain number of elements that can be electrically stimulated, for example, at type of comb structure of piezo crystal/ceramic, whereby each individual tongue that can oscillate can have either one or also several resonance frequencies. The natural frequency of these elements is preferably in a range that is not needed for the measurement or is not falsified or influenced by the other sensor structure. The oscillation elements that can be stimulated show significant resonance magnification in their natural frequencies upon stimulation which can be recognized as pattern for sensor identification. Even this realization of sensor identification in sensor element 2 can easily be used in a rough environment. The sensor identification 6 can, in a further development of the invention, also be designed as a passive electrical component, preferably an electrical resistance of known value, whose value that can be polled serving sensor identification. Passive electrical components such as the mentioned resistors or also capacitors, inductivities, wave guide pieces or complexly connected impedances can easily also be exposed to higher temperatures or other adverse environmental influences and make at least a simple sensor identification possible which is sufficient for many purposes. In addition to the possibilities for implementing sensor identification 6 that are mentioned above, there are of course a series of other suitable embodiments that are not listed here that could also be used in the arrangement according to the invention.

The sensor identification 6 can be polled by the analysis unit 4 via measuring line 9, or perhaps by its own data line. For this purpose, measuring line 9 and perhaps even sensor line 8 can have several leads, for example, a mass lead and/or one or more leads for the measurement signal and/or one or more leads for the query of sensor identification 6. The polled sensor identification 6 can now be used in order to retrieve data from a storage unit 5 that is connected with analysis unit 4 (e.g. directly via a data cable or indirectly via a network) for sensor-specific data allocated to sensor identification 6 such as, for example, measurement range, the resonance characteristic, the temperature drift, sensor sensitivity, operating times or prior damage, data about the calibration and similar data that individually identify each sensor of this type and that can also change over the course of the useful life of a sensor. With that, the analysis unit 4 can be parameterized or calibrated accordingly, whereby a correct transformation of the measurement signals from sensor element 2 into the sought-after measurement data is made possible.

In order to ensure that the polled sensor-specific data that are allocated to the sensor identification 6 also actually pertain to the connected sensor element 2, an additional data carrier 7, e.g. EEPROM, is mounted on sensor unit 1, on which sensor-specific data of sensor element 2 are stored. In the example of an embodiment according to FIG. 1, the data carrier 7 is located in sensor plug 3. Naturally, data carrier 7 an also be located at another position of sensor unit 1, for example, in sensor line 8 or also directly at sensor element 2. Data carrier 7 can now also—via measuring line 9 or its own data cable and perhaps via the sensor line 8—be read by analysis unit 4. Thus, analysis unit 4 receives two sets of sensor-specific data which agree with the first set of sensor-specific data in error-free condition and which can be compared in analysis unit 4 with the first set of sensor-specific data that is supplied by storage unit 5. Thereby, it can, for example, already be sufficient if only a part of the first and second set of sensor-specific data, for example, a manufacturer or serial number is compared with each other. This means that it is not absolutely necessary that all sensor-specific data that is required for correct measurement must be stored on the data carrier. Only when the first and the second set of sensor-specific data agrees, the analysis unit 4 is calibrated with data or parameterized and the measurement signals of sensor element 2 in analysis unit 4 are transformed into the sought-after measurement data taking the sensor-specific data into consideration.

In the event the comparison results in differences in the sensor-specific data, it must then be assumed that an error is present in the test assembly, for example, an erroneous allocation of sensor element 2 to the data carrier (e.g. after an exchange and the new cabling that is connected with such) or an erroneously stored set of data for sensor identification 6 in storage unit 5 or the receipt of corrupted sensor identification. However, the redundancy that is present in the measurement system concerning the sensor-specific data at least makes it possible to recognize such errors. In the case of an error, a corresponding error signal can then be generated by the analysis unit 4 and be issued at a suitable point, e.g. an alarm signal on the monitor of the central control of the test stand, to which the operating personnel can react. In this manner, erroneous measurements can be recognized and also be limited to a certain measuring chain (sensor element—sensor line/measurement line—analysis unit).

In light of the fact that in a usual application a number of sensor elements and also analysis units can be present, this already represents a significant improvement of current possibilities in error recognition and detection.

Naturally, many modifications of the shown arrangement of the individual components of the test assembly are conceivable. For example, the storage unit 5 can also be located in the analysis unit 4 or in the measurement line 9, the data carrier 7 can be located in or on the sensor element 2, the sensor identification 6 can be located outside of sensor element 2 (e.g. in the section of the sensor line 8 or also in or on the sensor plug 3), etc.

It is also conceivable that by clear sensor identification, entire measuring configurations can be tested as well. It is, for example, possible to record at which measuring channel which analysis unit 4 which sensor unit 1 is, or should be connected. This can be used in order to illustrate the measuring configuration graphically, for example, on a monitor of the test stand. Likewise, in this manner any change in the measurement configuration can be recognized and illustrated automatically (e.g. by cyclical polling of the configuration). An automatic verification of a specified measurement configuration, e.g. after building a test stand according to specific instructions is also possible.

The invention claimed is:

1. A test assembly for capturing measurement data comprising:
    a sensor unit having a sensor element that supplies measurement signals,
    a sensor identification provided in or on said sensor unit, said sensor identification unambiguously and individually identifying said sensor unit,
    a storage unit for storing a first set of sensor-specific data allocated to the sensor identification,
    a data carrier provided in or on sensor unit for storing a second set of sensor-specific data, and
    an analysis unit which
        (a) is connected with the sensor unit by a measuring line,
        (b) polls the sensor identification of the sensor unit and reads the first set of sensor-specific data allocated to the sensor identification from the storage unit,
        (c) reads the second set of sensor-specific data from the data carrier,
        (d) compares the first set of sensor-specific data and the second set of sensor-specific data, and
        (e) transforms said measurement signals into measurement data by taking sensor-specific data into consideration if the first and second set of sensor-specific data are in agreement.

2. The test assembly according to claim 1, wherein the sensor identification is located in or on the sensor element.

3. The test assembly according to claim 1, including a sensor plug in the sensor unit and wherein the data carrier is located in or on the sensor plug.

4. A method for capturing measurement data comprising the steps of:
    capturing at least one measurement variable with a sensor unit and sending the measurement signals via a measurement line to an analysis unit,
    polling a sensor identification provided in or on sensor unit with the analysis unit and reading of a first set of sensor-specific data allocated to the sensor identification from a storage unit by the analysis unit,
    polling of a second set of sensor-specific data from a data carrier provided in or on sensor unit with the analysis unit,
    comparing the first and the second set of sensor-specific data in the analysis unit, and
    transforming the measuring signals in the analysis unit into measurement data by taking sensor-specific data into consideration if the first and second set of sensor-specific data are in agreement.

* * * * *